United States Patent Office 3,592,952
Patented July 13, 1971

3,592,952
BLENDS OF AROMATIC POLYAMIDE WITH AROMATIC POLYAMIDE-ACID AND/OR POLYIMIDE
James C. Fang, Media, Pa., assignor to E. I. du Pont de Nemours and Company, Wilmington, Del.
No Drawing. Filed Feb. 27, 1968, Ser. No. 708,534
Int. Cl. C08g *41/04*
U.S. Cl. 260—857       7 Claims

ABSTRACT OF THE DISCLOSURE

Blend of a major amount of aromatic polyamide and a minor amount of an aromatic polyamide-acid and/or polyimide, useful as a coating having excellent adhesion, high impact resistance and low solvent crazing.

BACKGROUND OF THE INVENTION

Baked coatings of aromatic polyamides on metal substrates are known to possess good adhesion and mechanical properties useful for wire insulation. However, under mechanically stressed conditions, such coatings are observed to craze when in contact with certain organic liquids such as N-methyl pyrollidone. The present invention provides an aromatic polyamide coating having good adhesion, good mechanical properties and substantially reduced solvent crazing characteristics.

SUMMARY OF THE INVENTION

The present invention is directed to coating compositions, and coated articles utilizing such compositions, wherein such compositions comprise a major amount, i.e. more than about 50% and preferably more than about 60% by weight, of at least one aromatic polyamide and a minor amount, i.e. less than about 50% and preferably less than about 40% by weight, of an aromatic polyamide-acid and/or polyimide. Preferred proportions are in the range of about 80–99% of polyamide and 1–20% of polyamide-acid and/or polyimide.

The polyamide-acid component is convertible by known methods, e.g., heat and/or chemical treatment, to the corresponding polyimide. The present invention contemplates therefore compositions containing some unconverted polyamide-acid together with some converted polyimide, as well as compositions containing polyamide-acid and substantially no converted polyimide and vice versa.

Prior to coating and drying, the coating composition will also contain a mutually suitable solvent. In addition, the coating composition may contain one or more conventional additives such as pigments, dyes, plasticizers, color stabilizers, viscosity stabilizers, heat stabilizers, blowing agents, fillers, reinforcing agents, anti-stick agents, etc.

The aromatic polyamide component can be one or more of those known in the art. They and their preparation are described, for example, in Hill, Kwolek & Sweeney U.S. Pat. No. 3,094,511 issued June 18, 1963, the entire disclosure of which is hereby incorporated by reference. As stated therein, the aromatic polyamides are high molecular weight polymers characterized predominantly by the recurring structural unit.

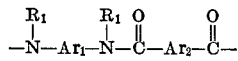

wherein $R_1$ is hydrogen or alkyl of 1–4 carbons, and wherein $Ar_1$ and $Ar_2$ can be the same or different and can be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, nitro, lower carbalkoxy, or other groups which do not form a polyamide during polymerization, the term "lower" referring to less than five carbon atoms.

The aromatic polyamides have repeating units linked by a carbonamide group, i.e. the

radical ($R_1$ being the same as above indicated), the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic ring. The term "aromatic ring" means a carbocyclic ring possessing resonance. Exemplary aromatic radicals have the following structural formulas

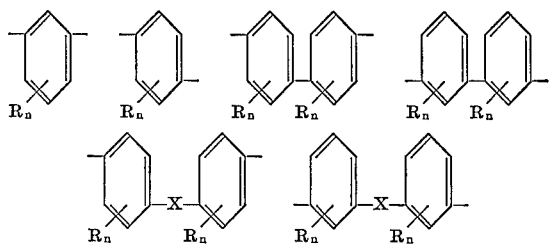

in which R is preferably a lower alkyl, lower alkoxy, or halogen group, n is a number from 0–4, inclusive, and X is preferably one of the groups of

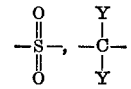

and —O—, in which Y is a hydrogen or a lower alkyl group. X may also be a lower alkylene or lower alkylene dioxy group although these are somewhat less desirable. R may also be a nitro, lower carbalkoxy, or other non-polyamide-forming group. All of these aromatic radicals are divalent and metal or para oriented, i.e., the unsatisfied bonds of the radicals (the "chain-extending bonds" when the radical is viewed in the repeating unit of the structural formula of the polymer) are meta or para oriented with respect to each other. One or more of the aromatic radicals may contain substituent groups as indicated and any aromatic ring may contain two or more of the same or different substituent groups. Preferable, however, are high molecular weight polymers in which the aromatic radicals are unsubstituted or contain only lower alkyl groups attached to any one ring. The term "non-polyamide-forming groups" refers to groups which do not form polyamides during the polymerization reaction herein disclosed. The term "chain-extending bond" refers to any bond in the polyamide which, if broken, would decrease the length of the polymer chain.

The aromatic polyamides are reaction products of an aromatic diacid chloride with an aromatic diamine, the aromatic diacid chloride being of the formula

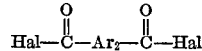

wherein $Ar_2$ is a divalent aromatic radical, i.e., it contains resonant unsaturation, and Hal is a halogen atom from the class consisting of chlorine, bromine, and fluorine. The aromatic radical may have a single, multiple, or fused ring structure. One or more hydrogens of the aromatic nucleus may be replaced by non-polyamide-forming groups such as lower alkyl, lower alkoxy, halogen, nitro, sulfonyl, lower carbalkoxy, and the like. The terms "lower alkyl" and "lower alkoxy" and "lower carbalkoxy" refer to groups containing less than five carbon atoms.

Diacid chloride which may be utilized to prepare the polyamides include isophthaloyl chloride and lower alkyl isophthaloyl chlorides, such as methyl-, ethyl-, propyl-, etc. isophthalolyl chlorides. There may be more than one alkyl group attached to the aromatic ring as in the case of dimethyl, trimethyl, tetramethyl, diethyl, triethyl, and tetraethyl isophthaloyl chlorides. It is not necessary that all of the alkyl substituent groups be the same because compounds such as 2-methyl-4-ethyl isophthaloyl chloride and 2-methyl-4-ethyl-5-propyl isophthaloyl chloride may be utilized the total number of carbon atoms in all the substituent groups (non-polyamide-forming groups) attached to the aromatic ring in the latter two compounds being 3 and 6, respectively. In place of an alkyl group, the aromatic ring in isophthalolyl chloride may be substituted with one or more lower alkoxy groups such as, for example, methoxy-, ethoxy-, propoxy-, butoxy-, etc., isophthaloyl chlorides. As with alkyl-substituted isophthaloyl chlorides, it is desirable that the total number of carbon atoms in the alkoxy groups attached to the aromatic ring be less than about five, but it is not necessary that all of the alkoxy groups be the same. Representative of such compounds are dimethoxy-, trimethoxy-, tetramethoxy, and diethoxy-isophthaloyl chlorides, and 2-methoxy-4-ethoxy isophthaloyl chloride. Halogen-substituted isophthaloyl chlorides as exemplified by chloro-, bromo-, and fluoro-isophthaloyl chlorides may be used. More than one halogen may be attached to the aromatic ring and dihalo isophthaloyl chlorides, such as dichloro-, dibromo-, difluoro-, or chlorobromo-, chlorofluoro-isophthaloyl chlorides are useful as are similar trihalo and tetrahalo isophthaloyl chlorides. The halogens in these compounds may be the same or different as in the case of the dihalo compounds.

Other isophthaloyl chlorides which may be used include nitro and lower carbalkoxy isophthaloyl chlorides. One or more of the latter groups may be attached to the aromatic nucleus along with one or more alkyl, alkoxy, or halogen groups. Thus, it will be apparent that the aromatic radical of the isophthaloyl chloride may contain one or more or any combination of lower alkyl, lower alkoxy, halogen, nitro, phenyl, lower carbalkoxy, or other non-polyamide-forming groups.

In addition to isophthaloyl chlorides and substituted isophthaloyl chlorides specified above, corresponding unsubstituted and substituted terephthaloyl chloride may also be used. The substituted terephthaloyl chlorides correspond to the substituted isophthaloyl chlorides described above and include lower alkyl, lower alkoxy, halogen, nitro, phenyl, and carbalkoxy substituted terephthaloyl chlorides. There may be one or more or a combination of these substituents attached to the aromatic ring so long as the total number of carbon atoms in all the substituents does not exceed nine. Representative terephthaloyl chloride compounds which may be mentioned include, in addition to the terephthaloyl chloride itself, methyl-, ethyl-, propyl-, butyl-, etc., terephthaloyl chlorides, methoxy-, ethoxy-, propoxy-, butoxy-, etc. terephthaloyl chlorides, chloro-, bromo-, dichloro-, chlorobromo-, etc., terephthaloyl chlorides and nitro and lower carbalkoxy terephthaloyl chlorides.

In addition to the single ring diacid chlorides specified above, multiple ring diacid chlorides in which the acid chloride groups are oriented meta or para with respect to chloride groups are also useful. Exemplary of such compounds are 4,4' - oxydibenzoyl chloride, 4,4'-sulfonyldibenzoyl chloride, 4,4' - dibenzoyl chloride, 3,3'-oxydibenzoyl chloride, 3,3'-sulfonyldibenzoyl chloride, and 3,3'-dibenzoyl chloride, the corresponding bromides and fluorides, and similar compounds in which one or both of the aromatic rings contains one or more or a combination of lower alkyl, lower alkoxy, halogen, nitro, sulfonyl, lower carbalkoxy groups.

The diamines useful as reactants in forming the polyamides are compounds of the formulas $H_2N—Ar_1—NH_2$ and $R_1—HN—Ar_1NH—R_1$ where $R_1$ is hydrogen or lower alkyl and $Ar_1$ is a divalent aromatic radical as defined above and the $—NH_2$ and $—NHR$ groups are oriented meta or para with respect to each other. The diamines may contain single or multiple rings as well as fused rings. One or more hydrogens of the aromatic nucleus may be replaced by non-polyamide-forming groups such as lower alkyl, lower alkoxy, halogen, nitro, sulfonyl, lower carbalkoxy as mentioned above. The aromatic nucleus of the diamines may be identical to any of the aromatic radicals mentioned above for the diacid chlorides, and the diamine utilized in any given instance may contain the same or different aromatic radical as the diacid chloride utilized. The total number of carbon atoms in the substituent groups attached to any aromatic ring should not exceed nine.

Exemplary diamines which may be utilized in this invention include meta-phenylene diamine and lower alkyl substituted meta-phenylene diamine such as methyl-, ethyl-, propyl-, etc., meta-phenylene diamine; N,N'-dimethylmetaphenylene diamine, N,N'-diethylmetaphenylene diamine, etc. There may be more than one alkyl group attached to the aromatic ring as in the case of dimethyl, trimethyl, tetramethyl, diethyl, triethyl, and triisopropyl meta-phenylene diamine. The alkyl substituent groups need not be the same because compounds such as 2-methyl-4-ethyl meta-phenylene diamine and 2-methyl-4-ethyl-5-propyl meta-phenylene diamine may be utilized. In place of an alkyl group, the aromatic ring may be substituted with one or more lower alkoxy groups such as, for example, methoxy-, ethoxy-, propoxy-, butoxy-, etc., meta-phenylene diamine. Other representative aromatic diamines which may be utilized include dimethoxy, trimethoxy, tetramethoxy, diethoxy meta-phenylene diamine, and 2-methoxy-4-ethoxy meta-phenylene diamine. Halogen-substituted meta-phenylene diamine as exemplified by chloro, bromo, and fluoro meta-phenylene diamine may be utilized. More than one halogen may be attached to the aromatic ring. The halogens in these compounds may be the same or different as in the case of the dihalo compound. Other meta-phenylene diamines which may be used include nitro and lower carbalkoxy meta-phenylene diamines. One or more of the latter groups may be attached to the aromatic nucleus along with one or more alkyl, alkoxy, or halogen groups so long as the total number of carbon atoms in the substituents attached to an aromatic ring does not exceed nine.

In addition to meta-phenylene diamine and substituted meta-phenylene diamines specified above, the corresponding unsubstituted and substituted para-phenylene diamine compounds may also be used. There may be one or more or a combination of substituents attached to the aromatic ring so long as the total number of carbon atoms in all substituents attached to an aromatic ring does not exceed nine.

In addition to the single ring aromatic diamines specified above, multiple or fused ring aromatic diamines in which the amino groups are oriented meta or para with respect to each other are also useful in this invention. Exemplary of such compounds are 4,4'-oxydiphenyldiamine, 4,4'-sulfonyldiphenyldiamine, 4,4'-diphenyldiamine, 3,3'-oxydiphenyldiamine, 3,3'-sulfonyldiphenyldiamine, and 3,3'-diphenylamine, and the corresponding compounds in which one or both of the aromatic rings contain one or more or a combination of lower alkyl, lower alkoxy, halogen, nitro, sulfonyl, lower carbalkoxy groups and the total number of carbon atoms in the substituent groups attached to an aromatic ring does not exceed nine.

The aromatic polyamide-acid and/or polyamide component can be one or more of those known in the art. They and their preparation are described, for example, in Edwards U.S. Pat. No. 3,179,614, Endrey U.S. Pat. No. 3,179,633 and Edwards U.S. Pat. No. 3,179,634, all issued Apr. 20, 1965. The entire disclosure of each of these patents is hereby incorporated by reference.

As shown in those patents, the aromatic polyamide-acids are characterized by the formula

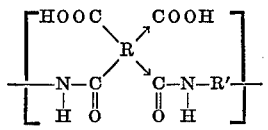

wherein the arrows denote isomerism.

R is a tetravalent organic radical, e.g., aromatics, aliphatic, cycloaliphatic, heterocyclic, combination of aromatic and aliphatic, and substituted groups thereof, and R′ is a divalent aromatic radical (arylene).

Illustrative of suitable R groups can be mentioned the following and substituted derivatives thereof:

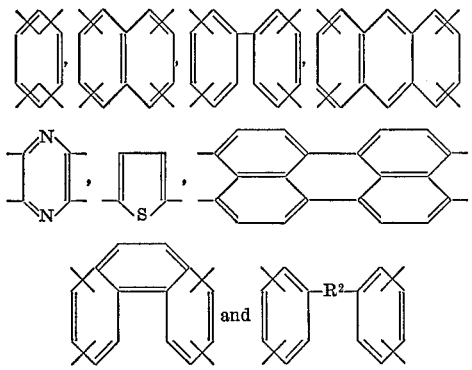

where $R^2$ is alkylene of 1–3 carbon atoms, oxygen, sulfur, or one of the following:

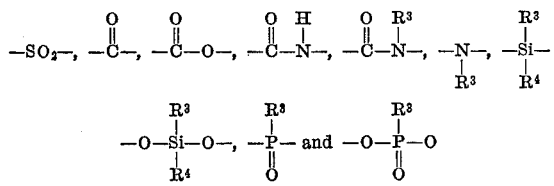

wherein $R^3$ and $R^4$ are alkyl or aryl, and substituted groups thereof.

Illustrative R′ groups include the following: phenylene, naphthylene, biphenylene, anthrylene, furylene, benzfurylene, and

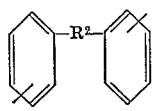

where $R^2$ has the same meaning as set forth in the preceding paragraph.

It will be recognized that the aromatic polyamide-acids are conveniently formed by reaction of organic diamines having the formula

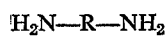

and tetracarboxylic acid dianhydrides having the formula

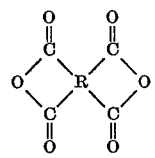

Illustrative of suitable diamines are:

meta-phenylene diamine,
paraphenylene diamine,
2,2-bis(4-aminophenyl)propane,
4,4′-diaminodiphenyl methane,
4,4′-diaminodiphenyl sulfide,
4,4′-diaminodiphenyl sulfone,
3,3′-diaminodiphenyl sulfone,
4,4′-diaminodiphenyl ether,
2,6-diaminopyridine,
bis(4-aminophenyl)diethyl silane,
bis(4-aminophenyl)diphenyl silane,
benzidine,
3,3′-dichlorobenzidine,
3,3′-dimethoxybenzidine,
bis(4-aminophenyl)ethyl phosphine oxide,
4,4′-diaminobenzophenone,
bis(4-aminophenyl)phenylphosphine oxide,
bis(4-aminophenyl)-N-butylamine,
bis(4-aminophenyl)-N-methylamine,
1,5-diaminonaphthalene,
3,3′-dimethyl-4,4′-diaminobiphenyl,
N-(3-aminophenyl)-4-aminobenzamide,
4-aminophenyl-3-aminobenzoate,
2,4-bis(beta-amino-t-butyl)toluene,
bis(p-beta-amino-t-butylphenyl)ether,
p-bis(2-methyl-4-aminopentyl)benzene,
p-bis(1,1-dimethyl-5-aminophenyl)benzene,
m-xylylene diamine,
p-xylylene diamine,
bis(4-aminophenyl)-N-phenylamine, and mixtures thereof.

Illustrative of suitable dianhydrides are:

pyromellitic dianhydride,
2,3,6,7-naphthalene tetracarboxylic dianhydride,
3,3′,4,4′-diphenyl tetracarboxylic dianhydride,
1,2,5,6-naphthalene tetracarboxylic dianhydride,
2,2′,3,3′-diphenyl tetracarboxylic dianhydride,
2,2-bis(3,4-dicarboxyphenyl) propane dianhydride,
bis(3,4-dicarboxyphenyl) sulfone dianhydride,
3,4,9,10-perylene tetracarboxylic dianhydride,
bis(3,4-dicarboxyphenyl) ether dianhydride,
ethylene tetracarboxylic dianhydride,
naphthalene-1,2,4,5-tetracarboxylic dianhydride,
naphthalene-1,4,5-8-tetracarboxylic dianhydride,
decahydrophthalene-1,4,5,8-tetracarboxylic dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
cyclopentane-1,2,3,4-tetracarboxylic dianhydride,
pyrrolidine-2,3,4,5-tetracarboxylic dianhydride,
pyrazine-2,3,5,6-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(3,4-dicarboxyphenyl)sulfone dianhydride,
benzene-1,2,3,4-tetracarboxylic dianhydride,
1,2,3,4-butane tetracarboxylic dianhydride,
thiophene-2,3,4,5-tetracarboxylic dianhydride,
3,4,3′,4′-benzophenone tetracarboxylic dianhydride,
2,3,2′,3′-benzophenone tetracarboxylic dianhydride,
2,3,3′,4′-benzophenone tetracarboxylic dianhydride,
and mixtures thereof.

Upon conversion as described above, polyimide is formed which is characterized by the formula

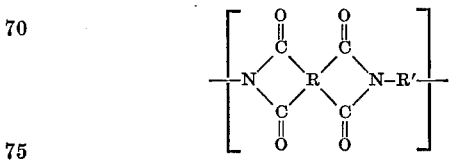

Preferred polyamide-acids and polyimides are those having the above formulas and wherein R' is selected from the group consisting of arylene radicals in meta-phenylenediamine, para - phenylene-diamine, benzidine, 4,4'-diaminodiphenyl propane, 4,4'-diaminodiphenyl methane, 4,4'-diaminodiphenyl ether, 4,4'-diaminodiphenyl sulfone and 4,4'-diaminodiphenyl sulfide, and wherein R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl)propane dianhydride, bis(3,4-dicarboxyphenyl) sulfone dianhydride, 3,4,9,10-perylene tetracarboxylic dianhydride, bis(3,4 - dicarboxyphenyl) ether dianhydride and 3,4,3',4'-benzophenone tetracarboxylic dianhydride.

The invention will be further understood by reference to the following illustrative examples in which parts and percentages are by weight unless otherwise indicated.

EXAMPLE 1

The following ingredients are charged into a reaction vessel:

| | Parts by weight |
|---|---|
| Isophthalic acid (1.0 mole) | 166 |
| N-methyl pyrrolidone | 340 |
| Toluene-2,4-diisocyanate (1 mole) | 174 |
| Total | 680 |

The isophthalic acid and N-methyl pyrrolidone are charged into a reaction vessel equipped with a stirrer, condenser, dropping funnel and thermometer and mixed thoroughly. The toluene disocyanate is added very slowly with constant agitation at room temperature over a period of about 10 minutes. Heat is applied gradually to the reaction mixture until the mixture reaches a temperature of about 73° C. As the heat is applied, carbon dioxide starts to form and comes off the reaction mixture. As the temperature increases, the rate of $CO_2$ formation also increases. The reaction is exothermic and the temperature of the reaction mixture rises to about 130° C. The reaction mixture is held at this temperature for about 1½ hours until the evolution of the gas stops. The temperature of the reaction mixture is maintained at 130–140° C. for an additional hour to insure completion of the reaction. 200 parts by weight of redistilled N-methyl pyrrolidone is added to reduce the viscosity of the polymer solution. The inherent viscosity of this polyamide polymer at 25° C. using a 0.5% polymer solids solution in N-methyl pyrrolidone is 0.84 and the Gardner Holdt viscosity at 31.2% solids is about 29.3 poises (or Z—1+¼). The polyamide polymer solution is stable at room temperature and shows no tendency to crystallize.

As a control, the toluene diisocyanate/isophthalic acid polyamide solution was applied as a thin coating onto aluminum and copper substrates and baked for 10 minutes at 300° F., followed by additional baking for 30 minutes at 550° F. The resulting coating shows excellent adhesion to the metal substrates as demonstrated by high resistance to scraping with a knife. The coating also shows good impact resistance in standard tests. This polymer coating, however, shows a tendency to craze under mechanical stress and upon contact with N-methyl pyrrolidone solvent.

According to the present invention, a mixture is made of 95 parts by weight of the polyamide polymer prepared as just described and 5 parts by weight of the polyamide-acid of pyromellitic dianhydride and oxydianiline. A second mixture is made of 90 and 10 parts by weight of the same ingredients, respectively. Thin coatings of these mixtures, applied and heated as in the control, show similar excellent adhesion and impact resistance as described for the control but surprisingly show little or no tendency to craze.

EXAMPLE 2

| | Parts by weight |
|---|---|
| Isophthalic acid (0.7 mole) | 116.2 |
| Terephthalic acid (0.3 mole) | 49.8 |
| N-methyl pyrrolidone | 340.0 |
| Toluene-2,4- and toluene 2,6-diisocyanate mixture (1.03 mole) | 179.2 |
| Total | 685.2 |

The isophthalic acid, terephthalic acid and N-methyl pyrrolidone are charged into a reaction vessel equipped with a stirrer, condenser, dropping funnel and thermometer and mixed thoroughly. The toluene diisocyanate is added dropwise at the room temperature over a period of 10 minutes. The mixture is gradually heated to 120° C. at which temperature exothermic reaction starts with the evolution of carbon dioxide. The temperature of the reaction mixture rises to about 135° C. The reaction mixture is held at this temperature for about ½ hour and then at 160–165° C. for about 1½ hours. The gas evolution stops completely and the reaction mixture becomes very viscous. 200 parts of redistilled N-methyl pyrrolidone and 100 parts of toluene are added to reduce the viscosity of the polymer solution. The inherent viscosity of this polyamide polymer at 25° C. using a 0.5% polymer solids solution in N-methyl pyrrolidone is 0.41.

When blended with minor amounts of polyamide-acid according to the procedure of Example 1, similarly satisfactory coatings can be made.

EXAMPLE 3

| | Parts by weight |
|---|---|
| Isophthalic acid (0.7 mole) | 116.2 |
| Terephthalic acid (0.3 mole | 49.8 |
| Toluene diisocyanate (0.83 mole) | 138.4 |
| Methylene diisocyanate (0.20 mole) | 50.0 |
| N-methyl pyrrolidone | 360.0 |
| Total | 714.4 |

A polyamide resin is prepared from the above ingredients following the procedure in Example 2. When blended with minor amounts of polyamide-acid according to the procedure of Example 1, similarly satisfactory coatings can be made.

EXAMPLE 4

| | Parts by weight |
|---|---|
| Isophthalic acid (0.5 mole) | 83 |
| Terephthalic acid (0.5 mole) | 83 |
| Toluene diisocyanate (1.03 mole) | 179 |
| N-methyl pyrrolidone | 300 |
| Total | 645 |

A polyamide resin is prepared from the above ingredients following the procedure in Example 2. 10 parts by weight of diglycidyl ether of bisphenol A is then added to the resin and the mixture is heated. The reaction mixture is held at 160° C. for 1½ hours.

When blended with minor amounts of polyamide-acid according to the procedure of Example 1, similarly satisfactory coatings can be made.

The invention claimed is:
1. A polymeric blend consisting essentially of (1) from 80 to 99% by weight of a polyamide having the structure

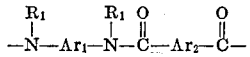

wherein $R_1$ is selected from the group consisting of hydrogen and alkyl of 1 through 5 carbon atoms and wherein $Ar_1$ and $Ar_2$ are each selected from the group consisting of unsubstituted and substituted divalent aromatic radicals, the chain-extending bonds of said divalent aromatic radicals being oriented meta or para to one another and the substitutents are at least (1) selected from the group consisting of alkyl of 1 through 4 carbon atoms, alkoxy of 1 through 4 carbon atoms, halogen, nitro, sulfonyl and carbalkoxy of 1 through 4 carbon atoms, and (2) from 1 to 20% by weight of at least one polymer selected from the group consisting of polyamide-acid and polyimide, said polyamide-acid having the formula

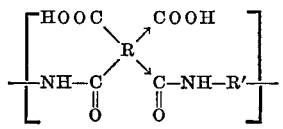

and said polyimide having the formula

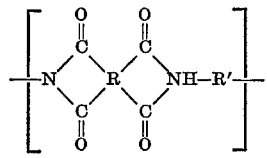

wherein the arrows denote isomerism;

R is selected from the group consisting of

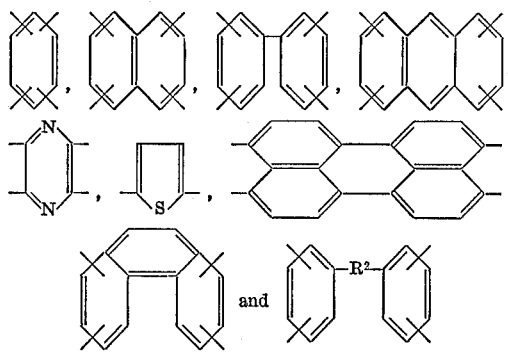

where $R^2$ is alkylene of 1-3 carbon atoms, oxygen, sulfur, or one of the following:

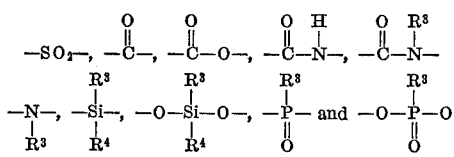

wherein $R^3$ and $R^4$ are alkyl or aryl, and substituted groups thereof and

R' is selected from the group consisting of phenylene, naphthylene, biphenylene, anthrylene, furylene, benzfurylene, and

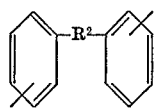

where $R^2$ has the same meaning as above.

2. An article coated with the composition of claim 1.
3. An article coated with the composition of claim 1.
4. An article having a surface of aluminum wherein said surface is coated with the polymeric blend of claim 1.
5. An article having a surface of copper, wherein said surface is coated with the polymeric blend of claim 1.
6. A mixture of polymers comprising (1) 80-99% by weight of an aromatic polyamide of a phthalic acid and an aryl diisocyanate and (2) 1-20% of a polymer selected from the group consisting of polyamide-acid and polyimide, said polyamide-acid having the formula

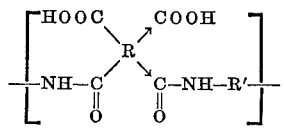

and said polyimide having the formula

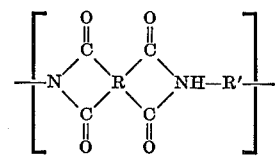

wherein the arrows denote isomerism;
R is selected from the group consisting of

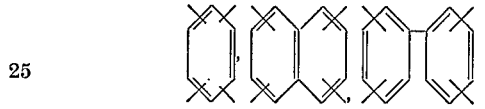

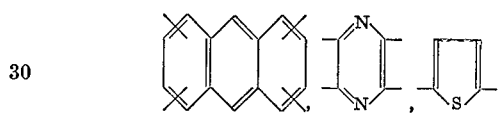

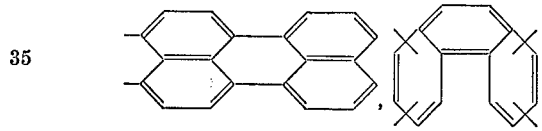

and

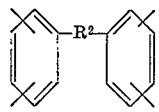

where $R^2$ is alkylene of 1-3 carbon atoms, oxygen, sulfur, or one of the following:

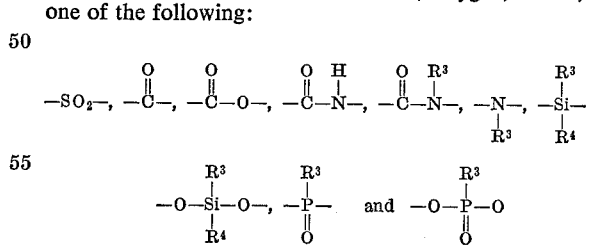

wherein $R^3$ and $R^4$ are alkyl or aryl, and substituted groups thereof and

R' is selected from group consisting of phenylene, naphthylene, biphenylene, anthrylene, furylene, benzfurylene, and

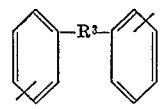

where $R^2$ has the same meaning as above.

7. A blend of (1) 90–95% polyamide of isophthalic acid and toluene-2,4-diisocyanate and (2) 5–10% polyamide-acid of pyromellitic acid and oxydianiline.

References Cited

UNITED STATES PATENTS

| | | | |
|---|---|---|---|
| 3,094,511 | 6/1963 | Hille et al. | 260—78 |
| 3,179,614 | 4/1965 | Edwards | 260—78 |
| 3,179,633 | 4/1965 | Endrey | 260—78 |
| 3,179,634 | 4/1965 | Edwards | 260—78 |
| 3,356,760 | 12/1967 | Matray | 260—857 |
| 3,416,994 | 12/1968 | Chalmers | 260—857 |

PAUL LIEBERMAN, Primary Examiner

U.S. Cl. X.R.

260—77.5, 78, 858